Jan. 20, 1931. L. DEUTSCH 1,789,429
CHAIN CONTROL FOR PUMPS
Filed Aug. 5, 1927

Inventor:
Leo Deutsch,
By Wilkinson, Huxley, Byron & Knight
Attys.

Patented Jan. 20, 1931

1,789,429

UNITED STATES PATENT OFFICE

LEO DEUTSCH, OF BEAVER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

CHAIN CONTROL FOR PUMPS

Application filed August 5, 1927. Serial No. 210,798.

This invention pertains to dispensing devices, and more particularly to a remote control for fluid dispensing apparatus.

It is an object to provide an inexpensive, positive and simple means for remotely controlling delivery of fluid from a fluid dispensing apparatus.

Another object is to provide control for a fluid dispensing device whereby it is possible to control the pump operating and delivering mechanism from a point remote from said device.

A further object is to provide a remote control for a fluid dispensing apparatus which, however, may be rendered inoperative under predetermined conditions of service of said apparatus.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1:
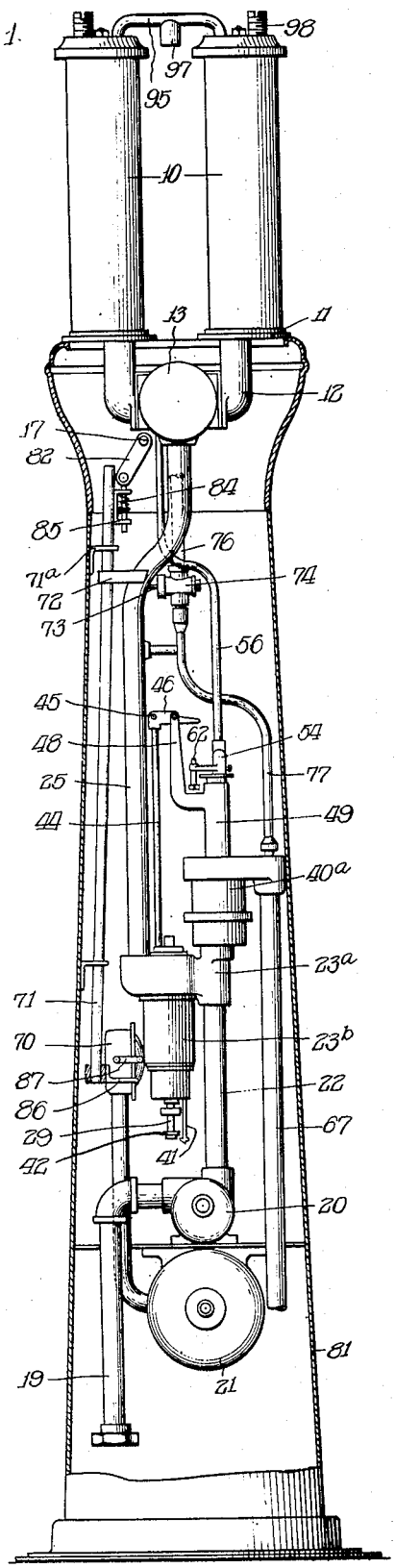
Figure 1 is a front elevational view, certain parts being broken away and certain parts being in section, of a fluid dispensing apparatus embodying the invention.
Figure 2:
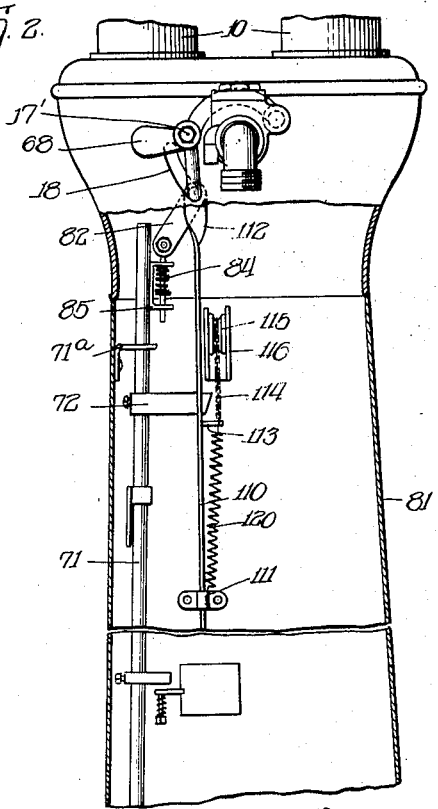
Fig. 2 is an enlarged fragmentary view showing in front elevation the discharge valve mechanism and connections to other control parts.
Figure 3:
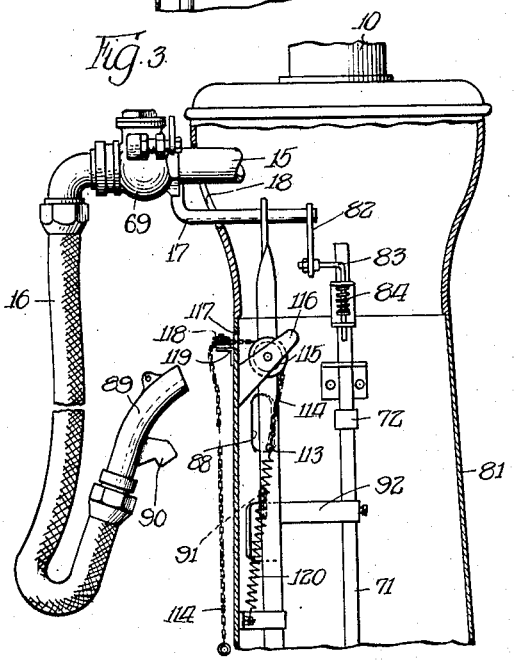
Figure 3 is a similar elevation taken substantially at right angles to Figure 2.

The operating mechanism, which is the subject-matter of this invention, is shown as applied to fluid dispensing apparatus such as shown in the application of Delanoy and Deutsch, Serial No. 147,942, filed November 12, 1926. It will readily be recognized that the fluid dispensing apparatus shown is of the super twin type, having two similar or twin cylinders or measuring chambers 10, preferably of glass, in which the fluid to be dispensed is measured, it being understood that as the fluid is supplied to one measuring chamber 10, fluid is being discharged from the other measuring chamber for the purpose of minimizing the time required to supply the fluid to the customer. These fluid containers may be of any desired capacity, such as one gallon.

The measuring chambers are mounted upon a support 11 carried by the usual standard, or casing 81, and said measuring chambers are provided with calibrating plugs 98 and are connected by an air connection 95 provided with a vacuum breaker 97, said connection being provided with suitable valves for preventing fluid from being transferred through the connection 95 from one measuring chamber to the other. Conduits 12 communicate with the measuring chambers 10 through the base members 11 and to a four-way valve 13 which controls the flow of fluid to and from the measuring chambers.

Fluid to be measured is supplied to said measuring chambers 10 from any suitable source of supply, such as indicated by the reference numeral 19, said fluid being forced by a pump 20, preferably operated by a motor 21, through the pipe 22, through a suitable valve member 23ª and through a pipe 25 connected to the lower end of the valve casing 13 to said valve casing where it is controlled and delivered to the proper measuring chamber. The valve casing 13 communicates through a pipe 15 to a proper discharge valve 69 connected to a discharge nozzle 89 by means of the flexible pipe 16. The discharge valve 69 is controlled and operated by means of the handle or throttle 68 operatively connected thereto and provided with a crank member 17 connected to a control rod 71 through the link 82 pivoted at one end thereto and at the other end to a rod 83 yieldably connected through the spring 84 to the bracket 85 secured to the control rod 71. It will be understood that this control rod may be slidably positioned in guideways or brackets 71ª secured to the casing at suitable points. One end of said control rod carries the finger 86 adapted to contact and operate a handle 87 of the motor control switch 70. The control rod 71 may also be provided with a cam or finger 72 adapted under certain conditions to contact the stem 73 of the bleeder valve 74, said valve being connected by means of the pipe 76 with the drain pipe 15 and connected by means of the drain pipe 77 to the overflow pipe 67 which is in communication with the cylinder 40ᵃ and the supply tank.

The cylinder 40ᵃ is in communication with the valve 23ᵃ and has a piston therein connected to a suitable piston rod provided with the bracket 54, said bracket being operatively connected to the valve in the casing 13 by means of the rod 56. The bracket 54 also carries an adjustable stud 62 which is adapted to contact with one arm of the latch lever or rocker 46, which lever is pivoted to the arm 48 provided on the cylinder 49 and has the rod 44 pivoted thereto at 45, which rod is in turn pivotally connected to the latch 41. The latch 41 is adapted to have operative contact with a collar 42 provided on the stem 29, the movement of which is controlled by a suitable means in cylinder 23ᵇ to effect operation of the valve disc in the valve 23ᵃ.

It will readily be appreciated that unless the valve operating handle 68 is operated to open the discharge valve 69, that operation of the apparatus cannot be effected. When, however, this valve is opened by movement of the handle 68, this will cause movement around the pivot 17', causing the arm 17 to move upwardly in the slot 18 provided in the casing 81, raising the control rod 71. This will cause finger 86 to move the control handle 87, closing the switch, which will start the pump 20 to operate by means of the motor 21. Fluid will then be pumped from 19, through the pump 20, through the pipe 22, through the open valve 23ᵃ, through the pipe 25, valve casing 13 and to one of the measuring chambers 10, it being understood that the other measuring chamber is discharging through its conduit 12, discharge pipe 15, valve 69, hose 16 and nozzle 89. When the measuring chamber 10 that is being supplied is filled, a back pressure will be built up in the pipe 25 and in the cylinder 23ᵇ, causing the means therein to operate the valve disc in the valve 23ᵃ to close communication between the pipe 22 and the pipe 25. The operation of the means in the cylinder 23ᵇ will cause the collar 42 to descend and be locked in lowered position by means of the latch 41.

It will be understood that as the pump is still in operation, the fluid will be pumped up into the cylinder 40ᵃ, operating the piston contained therein, causing said piston to rise, moving the bracket 54 upwardly and as this bracket is connected through the rod 56 to the valve 13, said valve will be suitably moved to shift the valve member contained therein to such a position that the filled measuring chamber will supply fluid to the overflow pipe and a connection will be established between the pipe 25, through the valve 13 and the conduit 12 to the empty measuring chamber 10. When the valve 13 has been shifted to fully opened position, the stud 62 will contact with one arm of the rocker 46, operating said rocker to move the rod 44, causing disengagement of the latch 41 from the collar 42 to allow the valve disc in the valve 23ᵃ to open, establishing communication from 19 through the connections enumerated to the empty measuring chamber. When pressure is thereby relieved from the piston in the cylinder 40ᵃ, said piston will descend under the influence of suitable means, such as a spring contained in the hollow cylinder 49, to a position where it may again be operated, any fluid contained in the cylinder 40ᵃ draining through the overflow pipe 67 back to the supply tank.

It will readily be understood that when the discharge valve is closed, the finger 87 will be disengaged from the control handle 87, opening the switch, which will stop the motor, thereby stopping the pump 20. Fluid will then be no longer supplied to the measuring chambers.

The control rod 71 is provided with a finger 92 disposed in way of a slot 91 conveniently located under the slot 88, said slots being provided in the casing 81. The nozzle 89 is provided with a projection 90 which is adapted to extend through the opening 91 and contact with the finger 92 when the nozzle 89 is rested in opening 88. This will cause the finger 92 to descend, in turn causing the control rod 71 to descend. The cam 72 then will contact with the stem 73 of the bleeder valve 74 which will cause any fluid contained in the four-way valve casing to be drained through the pipe 76, bleeder valve 74, pipe 77, overflow pipe 67 back to the supply tank.

In order to provide a remote control for the dispensing apparatus, a suitable rod 110 may be provided, slidably held within the casing by means of guides or staples 111 provided at intervals on the inside of said casing. Said rod is pivotally connected at the head 112 to the arm 17 for the operation of said arm to thereby control the operation of the valve 69. Said rod 110 may also be provided with a bracket 113 to which is anchored one end of a chain 114. Said chain passes over a pulley 115 positioned between arms 116 carried by the casing 81, through a suitable aperture 117 provided in the casing and over or between guide pulleys 118 suitably pivoted to a bracket 119 carried on the outside of said casing, it being understood that the chain 114 is of any desired length. A spring 120 may also be provided cooperating with the rod 110, tending to keep said rod in a lowered position to thereby keep the valve 69 in closed position. This spring may conveniently be positioned between the bracket 113 and a guide 111.

It will then be readily appreciated that in order to operate the dispensing device, it is first necessary to free the finger 92 by removing the nozzle 89 from the aperture 88.

A pull upon the chain 114 will raise the rod 110, causing actuation of the arm 17 to open the discharge valve 69 and operate the control rod 71 to thereby operate the dispensing apparatus in a manner already explained. It will also be appreciated that when the chain is released due to the weight of the parts and/or to the spring 120, (if such spring be provided), the discharge valve will be closed and the arm 17 will be moved to a lowered position, causing discontinuation of the operation of the dispensing apparatus.

It is to be understood that while the device has been described as applied to a certain type of dispensing apparatus that it may well be adapted to any type of such apparatus, and I do not wish to be limited to the exact embodiment shown which is merely by way of illustration and not by way of limitation as various and other forms of the device will readily occur to those skilled in the art.

I claim:

1. In a device of the character described, the combination of fluid measuring means, a discharge valve therefor, a dispensing nozzle for dispensing liquid from said discharge valve, means for remotely controlling said discharge valve, and means associated with and secured to said second named means whereby said second named means is positively rendered inoperative when said third named means is engaged by said discharge nozzle.

2. In liquid dispensing apparatus, the combination of liquid supply means having an operating device therefor, a discharge valve connected to said supply means, a slidable member for operating said operating device, a slidable member connected to said discharge valve and said first named slidable member for controlling operation thereof, and resilient means for returning said second named slidable means to inoperative position.

3. In liquid dispensing apparatus, the combination of liquid supply means having an operating device therefor, a discharge valve connected to said supply means, a member for operating said operating device, a slidable member connected to said discharge valve and said first named member for controlling operation thereof, the connection between said members including a lost motion connection, resilient means for returning said slidable member to inoperative position, and means on one of said members adapted to be engaged to take up said lost motion connection whereby operation of said second named member is positively prevented.

4. In liquid dispensing apparatus, the combination of liquid supply means having an operating device therefor, a discharge valve connected to said supply means, a discharge nozzle for delivering liquid from said discharge valve, a member for operating said operating device, a slidable member connected to said discharge valve and said first named member for controlling operation thereof, the connection between said members including a lost motion connection, resilient means for returning said slidable member to inoperative position, and means on one of said members adapted to be engaged by said nozzle to take up said lost motion connection whereby operation of said second named member is positively prevented.

Signed at Rochester, Pennsylvania, this 29th day of July, 1927.

LEO DEUTSCH.